Nov. 23, 1965  W. W. COLLINS ETAL  3,219,166
ROLLER CONVEYOR
Filed Oct. 12, 1962  4 Sheets-Sheet 3
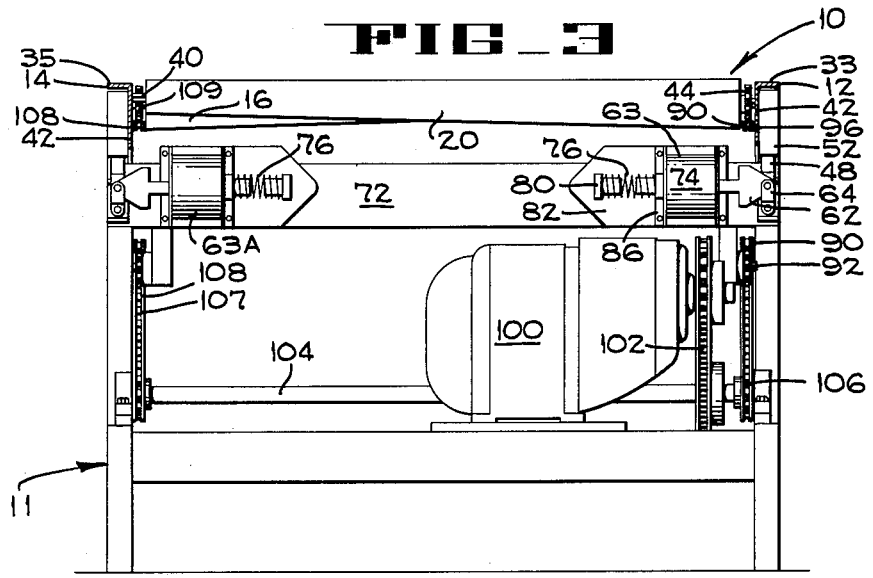
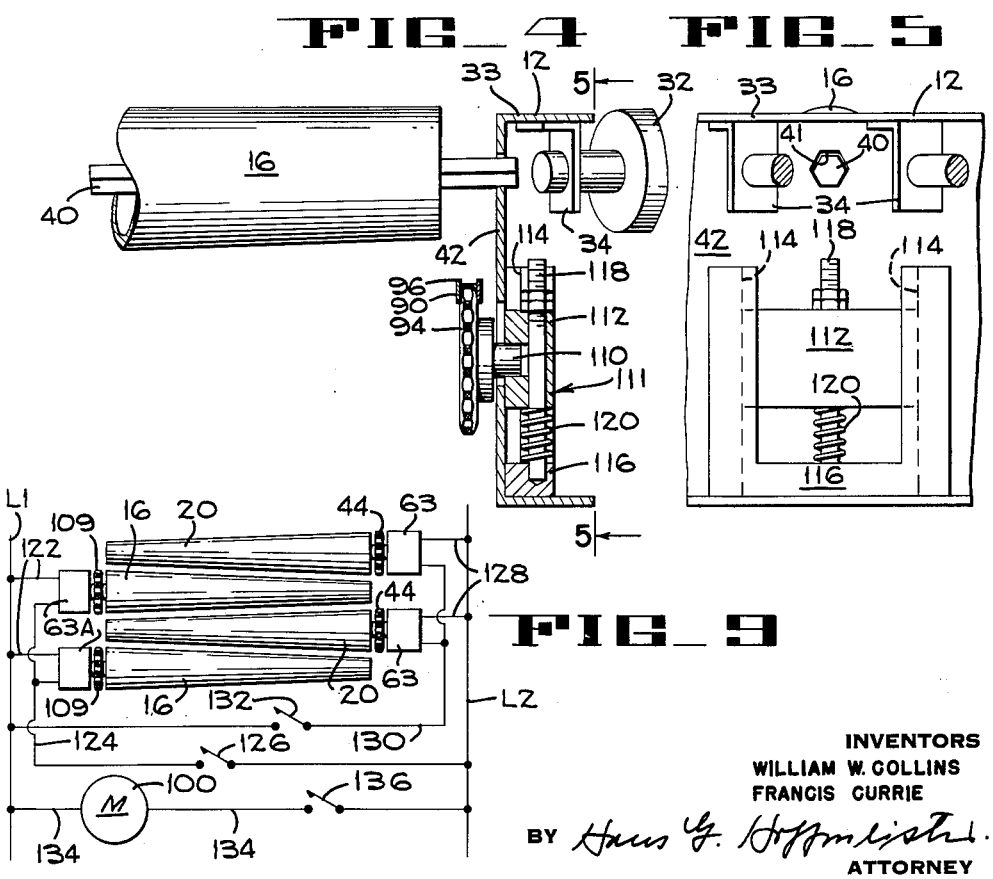
INVENTORS
WILLIAM W. COLLINS
FRANCIS CURRIE
ATTORNEY

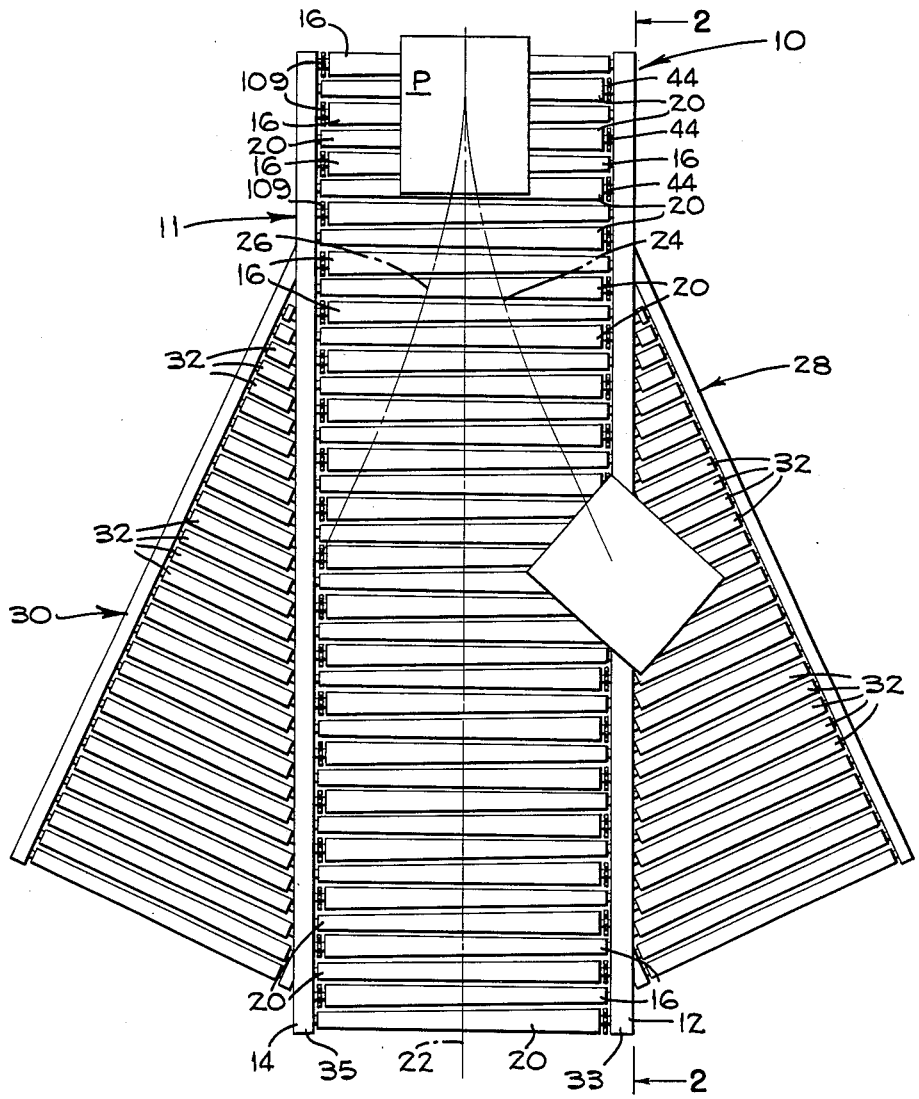

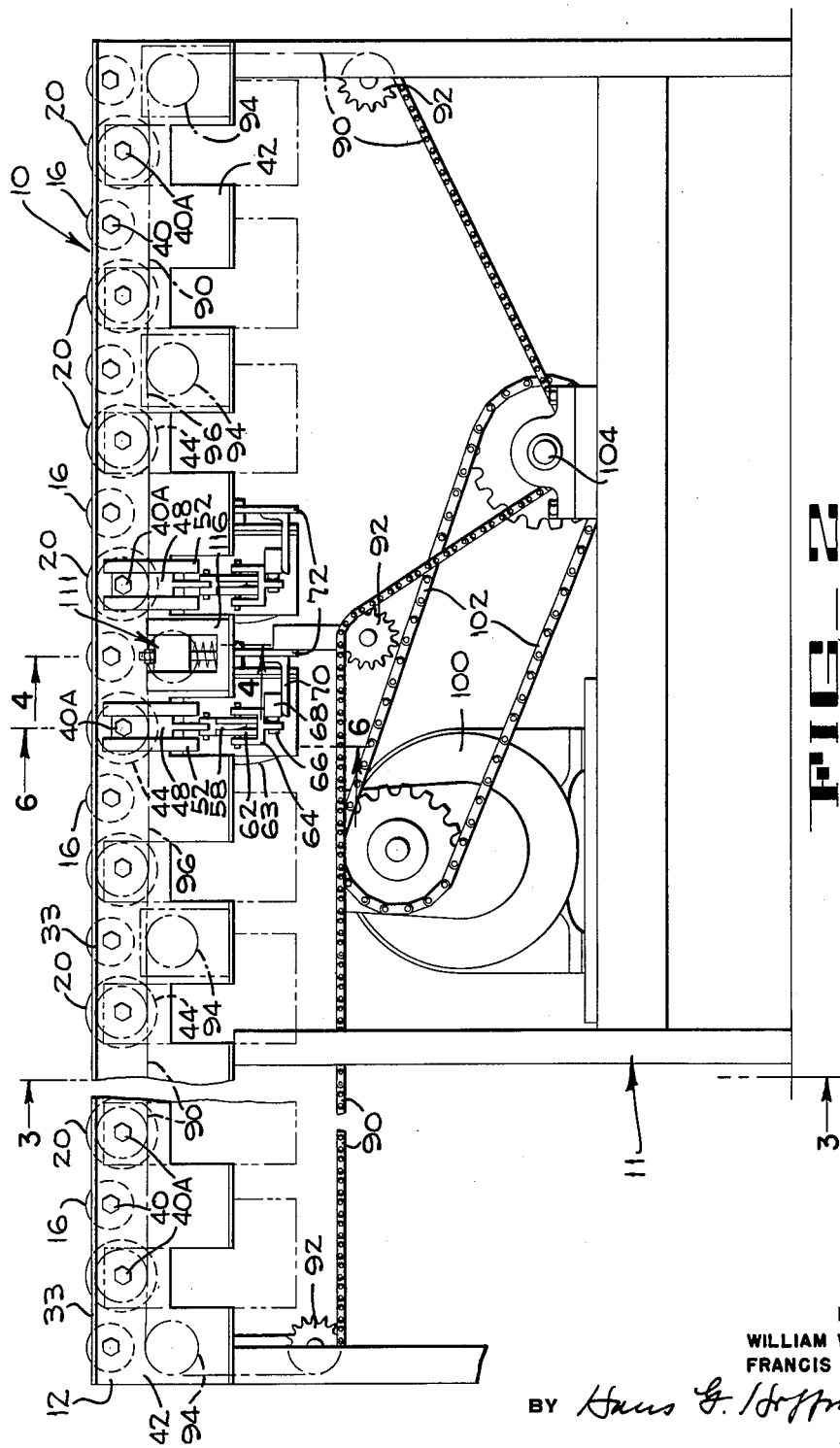

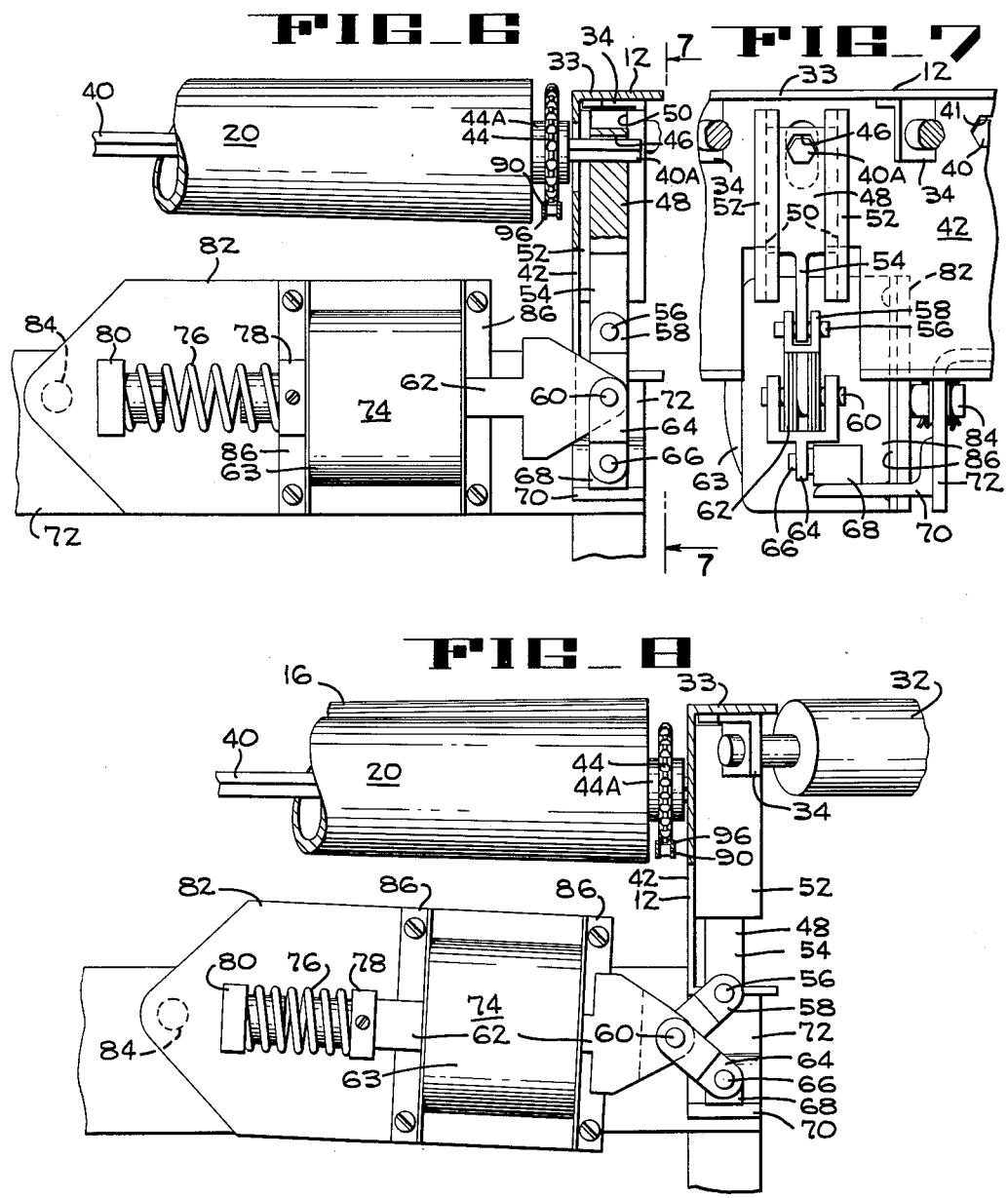

3,219,166
ROLLER CONVEYOR
William W. Collins and Francis Currie, San Jose, Calif., assignors to FMC Corporation, San Jose, Calif., a corporation of Delaware
Filed Oct. 12, 1962, Ser. No. 230,118
13 Claims. (Cl. 198—31)

The present invention pertains to roller conveyors, and more particularly relates to a roller conveyor which is adapted to convey articles in a linear path, or to divert the articles from the linear path and discharge them to one side or the other of the conveyor.

As a general rule, diverting conveyors normally employ auxiliary devices, such as guide rails or powered paddles mounted over the conveyor, to intercept and force the conveyed articles into a desired path other than the path aligned with the conveying surface. Such conveyors are not particularly compact, and are often incapable of handling articles which vary in size unless the diverting mechanism is adjusted. Further, many of the present diverting conveyors are not suitable for handling fragile articles because the diverting mechanism must contact the article, or vice versa, with considerable force.

The article diverting conveyor of the present invention is formed in a compact, self-contained roller conveyor unit requiring no auxiliary devices to intercept the articles, and may be used in a post office parcel sorting system for diverting parcels to various processing stations. The diverting conveyor comprises a linear arrangement of oppositely oriented, tapered and continuously driven rollers which can be selectively engaged with a parcel so that the parcel can be diverted from its otherwise linear path solely by means of the rollers which support and convey the parcel. The conveyor is capable of handling various size parcels without adjustment and is particularly efficient when fragile parcels, or parcels containing fragile articles are handled, because the parcels are not forcibly engaged by guide rails, paddles or stops.

One of the objects of the present invention is to provide an improved article diverting conveyor.

Another object of the invention is to provide an article diverting conveyor adapted to handle parcels of a wide range of sizes and in which the article weight is limited solely by the designed weight capacity of the conveyor.

A further object is to provide an article diverting conveyor which is compact in that it requires no overhead mechanism above its conveying surface to intercept the articles.

Another object of the present invention is to provide an article diverting conveyor which is particularly adapted to handle fragile articles.

Another object of the invention is to provide an article diverting conveyor in which driven rollers alone convey and are adapted to divert the articles without auxiliary diverting rails or paddles that engage the parcels.

Other objects and advantages of the present invention will become apparent from the following description and the accompanying drawings, in which:

FIGURE 1 is a diagrammatic plan of the article diverting conveyor of the present invention.

FIGURE 2 is a diagrammatic fragmentary side elevation, partly broken away of the conveyor of FIGURE 1, the view being taken as indicated by lines 2—2 on FIGURE 1, with one lateral conveyor removed from the unit.

FIGURE 3 is a transverse section taken along lines 3—3 on FIGURE 2, with parts broken away.

FIGURE 4 is an enlarged section taken on lines 4—4 of FIGURE 2, and illustrating a typical mounting for an idler sprocket.

FIGURE 5 is a vertical section taken on lines 5—5 of FIGURE 4.

FIGURE 6 is an enlarged section taken along lines 6—6 of FIGURE 2, and illustrating a solenoid operated roller control typical of the solenoid control for each roller in the diverting conveyor.

FIGURE 7 is a vertical section taken along lines 7—7 of FIGURE 6.

FIGURE 8 is a section similar to FIGURE 6, but showing the mechanism in a different operational position.

FIGURE 9 is a diagram of one form of an electrical control which may be used to control the article diverting conveyor.

The article diverting conveyor 10 (FIG. 1) includes a fabricated frame structure 11 which supports two parallel channels 12 and 14. Rotatably mounted between the two channels 12 and 14 is one roller set comprising a plurality of continuously driven frusto-conical rollers 16 which are oriented with their large ends disposed along the left side of the conveyor 10.

A second set of continuously driven rollers 20, identical to the rollers 16 are similarly mounted on the channels 12 and 14, each roller 20 having its larger end disposed at the right side of the conveyor and being disposed between two rollers 16 so that the tapered rollers 16 and 20 are in alternate arrangement. As will appear later in this description, the large ends of rollers 16 and 20 are independently movable in a vertical direction. When the rollers are in their normal, raised positions, their uppermost surfaces are in a common plane and form a substantially level article supporting and conveying surface above the channels 12 and 14.

As will also appear later, the rollers 16 and 20 are adapted to convey parcels, such as the parcel P, or other flat bottomed articles, along a linear path 22 which is generally parallel to the longitudinal centerline of the conveyor 10, or along either of two arcuate paths 24 and 26, which respectively diverge to the right and left from the linear path 22 and lead to associated discharge conveyors 28 and 30.

Each of the discharge conveyors 28 and 30 comprises freely rotatable rollers 32 which turn from the momentum of the discharged parcels and transfer the parcels to other conveying means, not shown. The conveyors 28 and 30 might in some installations be replaced by gravity chutes, sorting tables or power driven roller or belt conveyors, as they are merely accessory devices for the article diverting conveyor 10, and form no part of the present invention. As shown in FIGURE 8, each roller 32 of the discharge conveyor 28 is supported from the upper flange 33 of the channel 12 by an angle bracket 34 (FIG. 4) which depends from the flange. Similar brackets (not shown) secure the rollers 32 of discharge conveyor 30 to the upper flange 35 of the channel 14.

Each of the tapered rollers 16 and 20 (FIG. 4) is hollow and is provided with internal bearings, not shown, that rotatably support the roller on a non-rotatable hexagonal support shaft 40. The end of the support shaft 40, which projects from the small end of the roller, is mounted in a mating hexagonal aperture 41 (FIG. 5) in the vertical web 42 of the adjacent channel 12 or 14. The aperture 41 is slightly larger than the shaft 40 so that the opposite, large end of the roller and its shaft can be swung downwardly without causing the other end of the shaft to bind in its mounting aperture 41.

A solenoid actuated mechanism is provided for raising and lowering each of the rollers 16 and 20. Each mechanism is connected to the shaft 40 of the associated roller at the large end of the roller and, accordingly, the lowering mechanisms associated with the rollers 16 are mounted on the channel 14 while those associated with the rollers 20 are mounted on the channels 12. The mechanisms on channel 12 are identical to those on channel 14 but are oppositely disposed. Since the mechanisms are identical, a description of one lowering mechanism, mounted on channel 12 as shown in FIGURES 6–8 and associated with one of the rollers 20, will serve to disclose the construction and operation of all of these lowering mechanisms.

The hexagonal support shaft 40 (FIG. 6) of the roller 20 projects freely through a drive sprocket 44 which is provided with a driving connection to the roller as by welding the hub 44A of the sprocket to an annular end plate (not shown) on the roller. An end 40A of the shaft is mounted in a hexagonal aperture 46 in a vertically movable slide block 48. Each side edge of the slide block 48 is disposed in a way 50 of a guide bar 52 which is secured to the web portion 42 of the channel 12.

Depending from the lower end of each slide block 48 is an integral web 54 which is pivotally connected by a pivot pin 56 to the bifurcated upper end of an upper toggle link 58. Link 58 has an apertured lower end portion pivotally mounted on a pivot pin 60 which extends through the free end of an armature 62 of a solenoid 63, and through the bifurcated upper end portion of a lower toggle link 64.

A pivot pin 66 secures the lower end of the lower toggle link 64 to a fixed block 68 that is supported by an angle member 70. Angle 70 is secured to a fixed transverse frame member 72 that interconnects the channels 12 and 14. The armature 62 extends through the coil 74 of the associated solenoid 63 and into one end of a compression spring 76 that abuts a stop collar 78 which is adjustably locked on the armature. The other end of the spring 76 is mounted on a fixed spring retainer 80, the arrangement being such that when the solenoid is not energized, the spring 76 urges the solenoid armature 62 toward the toggle links 58, 64 whereby the links are moved into linear alignment to raise the block 48. Accordingly, the slide block 48 is maintained in its uppermost position until the solenoid is energized.

The spring retainer 80 is welded to a plate 82 which is arranged for vertical swinging movement about the axis of a stub pivot shaft 84 that is secured to the plate 82 and is rotatable in an aperture provided in the transverse frame member 72. The solenoid 63 is secured to plate 82 by mounting brackets 86 which are bolted to the plate so that the solenoid swings with the plate to accommodate what may be termed the extension and contraction of the assembly of toggle links 58 and 64.

When the upper and lower links 58 and 64 are in linear alignment, the uppermost surface of the roller 20 lies in the before-mentioned horizontal plane common to the uppermost surfaces of all of the rollers when their associated solenoid coils 74 are de-energized. The solenoids in the lowering mechanisms associated with the rollers 16 will be identified by reference numeral 63A. Accordingly, when the solenoids 63A (only one of which is shown in FIG. 3) which control rollers 16 are de-energized, the uppermost surfaces of the rollers 16 lie in the same horizontal plane. Thus, the compression springs 76 of the associated lowering mechanisms provide the necessary force to raise the large ends of the rollers 16 and 20 when the solenoids are de-energized and there is no parcel or other article resting thereon. As will be later mentioned in conjunction with the electrical controls, the solenoid coils associated with the rollers 16 are all energized at the same time and are never energized when the solenoids associated with rollers 20 are energized.

When the solenoid 63 (FIG. 8) is energized, at which time all of the other solenoids 63 will be energized, the armature 62 is drawn toward the coil 74 to compress spring 76 and cause the upper and lower toggle links 58 and 64 to pivot out of their former linear alignment. Thus, the slide block 48 is pulled downward in ways 50 of the guide bars 52, and the uppermost surface of the roller 20 is positioned below its parcel engaging position. Since all of the solenoid coils 74 are energized at the same time, the large ends of the rollers are simultaneously pulled downward so that their uppermost surfaces are below the coplanar uppermost surfaces of the rollers 16. Because the small ends of the rollers 20 are relatively fixed in the vertical webs of the channel 14, it will be apparent that the lowering of the rollers 20 removes their uppermost surfaces from engagement with the parcel for substantially the entire length of the rollers, except perhaps for a very small part of the smaller end portions of the rollers if the parcel is as wide as the length of the rollers. Similarly, when solenoids 63A are energized and solenoids 63 are not energized, the rollers 16 will be lowered until their uppermost surfaces are below the uppermost surfaces of rollers 20.

All of the rollers 20 (FIGS. 2 and 3) are continuously driven by a drive chain 90 which is trained around a plurality of idler sprockets 92 that are mounted on the frame 11 below channel 12, and over a plurality of idler sprockets 94 which are mounted on the channel 12 and support the horizontal upper flight 96 of the chain 90. The upper chain flight 96 is also engaged with each one of the roller drive sprockets 44 on the large ends of the rollers 20, and is driven to rotate the rollers in a direction advancing parcels towards the discharge conveyors 28 and 30.

The drive train includes a gear head motor 100 which, by a roller chain and sprocket drive connection 102, rotates a jackshaft 104 and a drive sprocket 106. The sprocket 106 is engaged with the chain 90. The jackshaft 104 (FIG. 3) extends across the conveyor and drives a chain and sprocket drive train 107 which includes a chain 108 arranged to drive sprockets 109 (FIG. 1) on the large ends of the rollers 16 in the same direction and at the same speed as the sprockets 44 on rollers 20.

Each of the idler sprockets 94 (FIG. 2) which support the upper chain flight 96 is mounted in a vertically depressible, spring biased mounting means 111 (FIGS. 4 and 5) that includes a stub shaft 110 which is disposed in a slotted portion of the web 42 of the channel 12, and on which the sprocket 94 is mounted for free rotation. The shaft 110 is secured to a slide block 112 that is mounted in vertical guide grooves 114 which are formed in the upright legs of a U-shaped bracket 116.

A central guide bolt 118 is secured to the base leg of the bracket 116 and extends upward through an aperture in the slide block 112. A compression spring 120, which is mounted on the bolt 118 between the slide block 112 and the bracket 116, urges the block 112 and the sprocket 94 carried by the block upwardly into meshing engagement with the upper flight 96 of the drive chain 90. Lock nuts on the upper end portion of the bolt 118 abut the slide block 112 and limit the upward movement of the sprocket 94.

The chain 108, which drives the sprockets 109 of rollers 16, is also trained over sprockets each of which is mounted in a spring biased mounting means that is identical to the mounting means 111 and is mounted on the channel 14.

FIGURE 9 illustrates one form of electrical control for simultaneously energizing the coils of either all of the solenoids 63A which control the rollers 16, or for simultaneously energizing all of the coils of the solenoids 63 which control the rollers 20 to cause parcels to be diverted onto the discharge conveyor 28 or onto the discharge conveyor 30. The coils of the solenoids 63A are connected to power input lines L1 and L2 by lines 122 and 124, line 124 having a manually operated switch 126 connected therein. When switch 126 is closed, all the coils of the solenoids 63A are simultaneously energized. In similar manner, the coils of the solenoids 63 which control the rollers 20 are connected by lines 128 and 130 to the input lines L1 and L2. A manually operated switch 132 is connected in line 130 so that all of the coils of solenoids 63 will be simultaneously energized when the switch 132 is closed. The drive motor 100 is connected to lines L1 and L2 by lines 134, in one of which is provided a switch 136 that is maintained closed to continuously energize the motor 100 when the article diverting conveyor 10 is in operation.

When the diverting conveyor 10 is installed and is operating, switch 136 is closed to energize motor 100 so that all of the rollers 16 and 20 are continuously driven. The inlet end 18 of the article diverting conveyor 10 lies adjacent the discharge end of a supply conveyor, not shown, which carries a series of spaced parcels onto the upstream rollers 16 and 20. The two roller control switches 126 and 132 are located at the operator's station near the article diverting conveyor 10 where the operator may, for example, read a previously applied mark on the parcel which indicates whether the parcel should progress straight ahead, or should be diverted to the right or left onto discharge conveyor 28 or 30.

As a further example, the mark on the parcel might be a machine readable mark such as a suitably energized fluorescent mark, or a mark made with magnetic ink, whereby the mark on the parcel will cause a signal light visible to the operator to be energized which indicates the desired one of the three possible conveying paths. In any event, when the destination of the parcel is known by the operator, he actuates switch 132 to depress rollers 20 if the parcel is to be discharged to the left onto conveyor 28, switch 126 if the article is to be discharged to the right onto conveyor 30, or he does not actuate either switch if the parcel is to be carried straight along the article diverting conveyor 10.

Assuming that the parcel P (FIG. 1) is not to be diverted from the conveyor 10, neither switch 126 or 132 is actuated and the rollers 16 and 20, accordingly, remain in their normally raised positions in which their uppermost surfaces are horizontal and coplanar.

Because the tapered form of each roller 16 and 20 provide peripheral speeds increasing at successive transverse planes through the roller toward its larger end, those smaller portions of the rollers 16 at the left side of the centerline path 22 tend to drive the parcel at a speed less than the speed at which the larger portions of the same rollers tend to drive the parcel. This same condition is true of the rollers 20.

Accordingly, when both sets of the rollers 16 and 20 are engaged with the parcel, and the parcel is centered on the centerline path 22 of conveyor 10, the unequal driving effect of the rollers 16 is offset by the unequal driving effect of the rollers 20. As a result, balanced drive forces upon the parcel are caused by the alternate orientation of the rollers 16 and 20, and the parcel progresses along the centerline path 22 and remain on path 22 without any auxiliary guide means.

If the parcel P is to be diverted to the left of the diverting conveyor 10 onto the discharge conveyor 28, the operator closes the switch 132 (FIG. 9), thus energizing all of the solenoids 63 and causing all of the rollers 20 to be lowered so that their uppermost surfaces lie below the coplanar uppermost surfaces of the rollers 16. Rollers 16, accordingly, provide the only driving force for the parcel, and this force is unequally applied to the opposite side end portions of the bottom surface of the parcel because of the tapered form of the rollers. The parcel is thus diverted from the centerline path 22 as it is conveyed and follows the arcuate discharge path 24 onto the discharge conveyor 28.

A diverting operation to cause the parcel to be diverted to the right onto the discharge conveyor 30 is carried out in a similar manner by closing the switch 126, thus causing all of the rollers 16 to simultaneously move to positions where they will not engage the incoming parcel. Rollers 20 then cause the parcel to follow the arcuate path 26 onto the discharge conveyor 30 in a manner identical to the operation described for a diverting operation in the opposite direction.

The diverting conveyor 10, it is to be noted, is effective with parcels of different sizes and is not limited to parcels having a width less than the length of the rollers 16 and 20. It will also be apparent that the article diverting conveyor 10 is adapted to handle parcels of greater length than the parcel P.

It is to be emphasized in particular that by providing parcel control functions incorporated in the parcel conveying rollers, no auxiliary mechanisms requiring various timings or critical dimensions or placement for different parcel sizes are required, and the diverting conveyor 10 is, therefore, capable of handling a wide range of parcel sizes. Also it will be noted that the absence of such auxiliary mechanisms and the gentle handling of the parcels afforded by the rollers, make the article diverting conveyor 10 useful in handling fragile parcels, or parcels containing fragile articles.

While a particular embodiment of the present invention has been shown and described, it will be understood that the diverting conveyor 10 is capable of modification and variation without departing from the principles of the invention and that the scope of the invention should be limited only by the scope and proper interpretation of the claims appended hereto.

We claim:

1. An article diverting conveyor comprising a support frame having spaced side edges, a first set of tapered rollers mounted on said frame and extending transversely thereof in a common orientation relative to each other with their large ends adjacent one side edge of said frame, a second set of tapered rollers oppositely oriented relative to said first set of rollers and mounted on said frame, each roller of said second set being disposed adjacent a roller of said first set and having its upper surface in the same horizontal plane and cooperating therewith to jointly support an article, roller actuating means connected to the large ends of the rollers of said first and second roller sets for selectively moving the rollers of one set from positions in which their uppermost surfaces lie in a substantially horizontal plane to depressed positions wherein their uppermost surfaces are below said plane and the article is supported on the rollers of the other set for conveyance along a curved path, and drive means engaged with said rollers in each of said roller sets for simultaneously rotating the rollers of both sets in the same direction and at the same rate of speed.

2. An article conveyor comprising a support frame, a first set of tapered rollers mounted across said frame in similar orientation, a second set of tapered rollers mounted across said frame in intermeshed relation to said first set and in opposite orientation thereto, the uppermost surfaces of the rollers of both of said roller sets forming a coplanar article support and conveying surface, drive means engaged with the rollers of both of said roller sets for rotating all of said rollers in the same direction at the same speed, and solenoid-operated actuating means connected to each roller and capable of selective energization for simultaneously moving the rollers of each of said roller sets to positions wherein their uppermost surfaces are below the coplanar upper surfaces of the rollers of the other roller set.

3. An article diverting conveyor comprising an elongate support frame, a first set of tapered rollers mounted in said frame and being oriented with their larger ends adjacent one side edge of the frame, a second set of tapered rollers mounted in said frame and being oriented with their larger ends adjacent the opposite side edge of said frame, each roller of said first set of rollers being disposed alongside a roller of said second set and the uppermost surfaces of all of the rollers of both of said roller sets forming a coplanar article support and conveying surface, drive means engaged with each roller of said first and second roller sets for rotating all of said rollers in the same direction and at the same speed, and roller lowering means connected to each roller of said first and second roller sets for selectively and simultaneously moving the rollers of one of said roller sets to positions wherein the uppermost surfaces of the rollers are displaced below the coplanar uppermost surfaces of the rollers of the other roller set to deposit an article being supported jointly by the rollers of both sets onto the rollers of the other set for conveyance thereby.

4. An article diverting conveyor comprising a support frame, a first set of tapered rollers mounted across the upper portion of said frame in the same orientation, a second set of tapered rollers mounted across the upper portion of said frame in intermeshed relation to said first roller set and in opposite orientation thereto, the uppermost surfaces of all of the rollers of both of said roller sets forming a coplanar article support and conveying surface, drive means engaged with each roller of said first and second roller sets for rotating all of said rollers in the same direction and at the same speed, and roller actuating means individually connected to the rollers of one of said roller sets for moving said rollers of said one set to positions wherein the uppermost surfaces of the rollers are displaced from the coplanar uppermost surfaces of the rollers of the other roller set whereby an article supported jointly by the rollers of both sets will be deposited on the rollers of the other set and will be conveyed forwardly along a curved path.

5. An article diverting conveyor comprising an elongate support frame, a first set of tapered rollers extending transversely of said frame and having like orientation mounted across said support frame, a second set of rollers oppositely oriented relative to said first set of rollers and in intermeshed relation thereto, the uppermost surfaces of the rollers of both of said sets of rollers forming a coplanar article support and conveying surface, means for simultaneously driving all of said rollers in the same direction and at the same rate of speed, and means for depressing the rollers of said first of said roller sets to positions wherein their uppermost surfaces lie below said coplanar article support and conveying surface to deposit an article supported jointly by the rollers of both sets onto the surface of the second set of rollers for conveyance thereby.

6. An article diverting conveyor comprising a support frame, a first set of similarly oriented frusto-conical rollers mounted on said frame, electrically operated first roller actuating means individually connected to the common ends of said rollers for moving said rollers from positions wherein their uppermost surfaces provide an article support and conveying surface in a substantially horizontal plane, a second set of frusto-conical rollers mounted on said frame in orientation common to each other but opposite to said first set of rollers and in intermeshed relation thereto, driving means connected to each roller of said first and second roller sets for simultaneously rotating all of said rollers in the same direction and at the same speed, electrically operated second roller actuating means individually connected to the common ends of the rollers of said second roller set for moving the rollers from positions wherein their uppermost surfaces are coplanar and in said horizontal plane, electrical control means for selectively energizing said first and second roller actuating means, and resilient means connected to each of said rollers and urging each roller individually to a position wherein said uppermost surface of the roller lies in said horizontal plane.

7. An article diverting conveyor comprising a support frame, a plurality of tapered rollers mounted on said support frame, adjacent rollers being oriented in opposite directions and the uppermost surfaces of all of said rollers lying in a common plane, drive means connected to said rollers for simultaneously driving all of said rollers in the same direction and at uniform speed, first roller actuating means connected individually to each of said rollers that have a common orientation for simultaneously depressing all of the rollers thus oriented out of said common plane, and second roller actuating means connected individually to each of said rollers that are oriented in the opposite direction for simultaneously depressing all of the roller thus oriented out of said common plane, downward movement of one set of commonly oriented rollers being effective to deposit an article supported jointly by all of the rollers onto the surface of the other set of tapered rollers for conveyance along a curved path.

8. An article conveyor comprising a support frame, a first set of similarly oriented generally frusto-conical rollers mounted on said frame, first roller actuating means comprising a solenoid connected to each of the large common ends of said rollers for moving said rollers downward from positions wherein their uppermost surfaces provide an article support and conveying surface in a substantially horizontal plane, a second set of generally frusto-conical rollers mounted on said frame in orientation common to each other but opposite to and intermeshed with said first set of rollers, second rollers actuating means comprising a solenoid connected to each of the large common ends of the rollers of said second set for moving said rollers downward from positions wherein their uppermost surfaces are coplanar and in said substantially horizonal plane, resilient means biasing each roller upwardly toward said horizontal plane, electrical control means for energizing the solenoids respectively associated with one of said roller sets independently of the solenoids associated with the other of said roller sets, and drive means connected to the rollers of said first and second roller sets for simultaneously rotating all rollers in the same direction at the same speed.

9. An article conveyor comprising a support frame having spaced side members, first and second sets of rollers extending between said side members and having upper surfaces coacting to jointly support an article to be conveyed, means mounting each roller for generally vertical pivoting movement about one of its ends, lowering means connected to the other end of each roller to pivot the roller downwardly about said one end, means for simultaneously actuating the lowering means of all the rollers of said first set to move the rollers downwardly to a position wherein their upper surfaces are below said common plane and an article resting on both sets of rollers will be supported only on the surfaces of said second set, means for rotating said second set of rollers, and means responsive to rotation of said rollers for moving the article laterally as it is carried forwardly on said second set of rollers.

10. Conveyor apparatus comprising a linear array of tapered rollers mounted for rotation about individual axes, each roller being oriented opposite to the adjacent rollers and the uppermost surfaces of said rollers being in a common horizontal plane, and means for independently lowering at least one end of each of said rollers having common endwise orientation so that the uppermost surfaces of the lowered rollers lie below said horizontal plane.

11. Conveyor apparatus comprising a linear array of tapered rollers mounted for rotation about individual axes, each roller being oriented opposite to the adjacent rollers and the uppermost surfaces of said rollers being in a common horizontal plane, power means connected to said rollers for simultaneously rotating said rollers in the same direction and at the same speed, and means for independently lowering at least one end of each of said rollers having common endwise orientation so that the uppermost surfaces of the lowered rollers lie below said horizontal plane.

12. Conveyor apparatus comprising a linear array of tapered rollers mounted for rotation about individual axes, each roller being oriented opposite to the adjacent rollers and the uppermost surfaces of said rollers being in a common horizontal plane for supporting flat bottom articles, means for independently lowering at least one end of each of said rollers having common endwise orientation whereby the uppermost surfaces of the lowered rollers lie below said horizontal plane so as to divert the articles laterally along an arcuate path, and article receiving means diverging from said conveyor for receiving the diverted articles.

13. Conveyor apparatus comprising a linear array of tapered rollers mounted for rotation about individual axes, each roller being oriented opposite to the adjacent rollers and the uppermost surfaces of said rollers being in a common horizontal plane for supporting flat bottom articles, power means connected to said rollers for simultaneously rotating said rollers in the same direction and at the same speed, means for independently lowering at least one end of each of said rollers having common endwise orientation so that their uppermost surfaces lie below said horizontal plane whereby the articles on said conveyor are diverted laterally therefrom, and article receiving means adjacent said conveyor for receiving the laterally diverted articles.

References Cited by the Examiner
UNITED STATES PATENTS

| | | | |
|---|---|---|---|
| 1,114,621 | 10/1914 | Lewis | 198—127 |
| 1,468,837 | 9/1923 | Schreck | 198—127 X |
| 1,693,014 | 11/1928 | Anderson | 198—81 |
| 3,018,873 | 1/1962 | Burt | 198—38 |
| 3,054,514 | 9/1962 | Riley | 193—36 |

SAMUEL F. COLEMAN, *Primary Examiner.*

WILLIAM B. LA BORDE, ERNEST A. FALLER,
*Examiners.*